(12) United States Patent
Suzuki et al.

(10) Patent No.: US 6,469,100 B2
(45) Date of Patent: *Oct. 22, 2002

(54) PROPYLENE BLOCK COPOLYMER AND RESIN COMPOSITION

(75) Inventors: Toru Suzuki, Kanagawa; Toshihiko Sugano, Mie; Hironari Sano, Mie; Motohiro Seki, Mie; Takao Tayano, Mie; Hiroshi Nakano, Mie, all of (JP)

(73) Assignee: Japan Polychem Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/325,384

(22) Filed: Jun. 4, 1999

(65) Prior Publication Data

US 2001/0014719 A1 Aug. 16, 2001

(30) Foreign Application Priority Data

Jun. 4, 1998 (JP) .......................................... 10-155820
Jun. 4, 1998 (JP) .......................................... 10-155821

(51) Int. Cl.$^7$ ............................................. C08L 53/00
(52) U.S. Cl. ........................ 525/88; 240/323; 240/322; 526/943
(58) Field of Search ........................ 525/88, 240, 323, 525/322; 526/943

(56) References Cited

U.S. PATENT DOCUMENTS

| | | | |
|---|---|---|---|
| 5,280,074 A | 1/1994 | Schreck et al. ............. 525/240 |
| 5,322,902 A | 6/1994 | Schreck et al. | |
| 5,391,618 A | 2/1995 | Yamamoto et al. | |
| 5,563,194 A | 10/1996 | Watanabe et al. | |
| 5,874,505 A | * 2/1999 | Saito et al. ................. 525/240 |
| 5,891,946 A | 4/1999 | Nohara et al. | |
| 6,034,177 A | 3/2000 | Sobajima et al. | |
| 6,100,333 A | 8/2000 | Collina et al. | |

FOREIGN PATENT DOCUMENTS

| | | |
|---|---|---|
| EP | 0 411 627 | 2/1991 |
| EP | 0 594 264 | 4/1994 |
| EP | 0 714 923 | 6/1996 |
| JP | 6-287257 | 10/1994 |
| JP | 8-12826 | 1/1996 |

OTHER PUBLICATIONS

US 5,168,111, 12/1992, Canich (withdrawn)

* cited by examiner

*Primary Examiner*—Rachel Gorr
(74) *Attorney, Agent, or Firm*—Oblon, Spivak, McClelland, Maier & Neustadt, P.C.

(57) ABSTRACT

A block copolymer is provided comprising one or more blocks of a propylene polymer (PP) and one or more blocks of an ethylene-propylene copolymer (EPR) having the properties:

(1) the interface thickness of the PP block with EPR block is from 20–1000 nm;
(2) the weight average molecular weight of the PP block is 10,000–1,000,000;
(3) the proportion of mesopentad chain in the PP block is not less than 95%;
(4) the particle diameter of the disperse phase in EPR block is 0.2–3 microns;
(5) the weight average molecular weight of the EPR block is 50,000–1,000,000;
(6) the propylene content in the EPR block is 20–80 mole %;
(7) the composition fluctuation in molecular weight in EPR block is within +/−5% from the average composition.

6 Claims, No Drawings

PROPYLENE BLOCK COPOLYMER AND RESIN COMPOSITION

FIELD OF THE INVENTION

The present invention relates to a block copolymer comprising a polypropylene and an ethylene-propylene copolymer. More particularly, the present invention relates to a block copolymer having a good impact resistance.

BACKGROUND OF THE INVENTION

Most block copolymers having two or more polymers mutually connected to each other (including not only those having PP block and EPR block actually connected to each other but also apparent block copolymers having PP block and EPR block dispersed in one polymer particle obtained by continuous polymerization) exhibit far excellent properties than single mixture of homopolymers constituting these block copolymers while maintaining the characteristics of these homopolymers. Therefore, many attempts have been made on these block copolymers for the purpose of improving the properties and function of polymers.

On the other hand, most resin compositions which are obtained by blending two or more kinds of resins to improve impact resistance while maintaining the rigidity of polypropylene as a crystalline resin (often called "polymer blend", "polymer alloy", etc.) can have its constituent resins to compensate for defects each other while maintaining the advantages of the constituent resins. Various studies have been made of these resin compositions.

Among these resin compositions, those obtained by blending PP resin as a crystalline resin and EPR as a rubber component exhibit different properties with the kind and characteristics of these components. Accordingly, it has been necessary that studies be made of the blend of these components on a trial and error basis.

In particular, such a resin composition, if used for purposes such as structural material, must exhibit some impact resistance and rigidity at low temperatures. However, no techniques for balancing the two properties on a high level have been established.

Most resin compositions obtained by melt-mixing two or more kinds of resins (often called "polymer blend", "polymer alloy", etc.) can have its constituent resins to compensate for defects each other while maintaining the advantages of the constituent resins. Various studies have been made of these resin compositions ("Polymer Alloy", page 62, Kyoritsu Shuppan, 1988). This polymer blending technique is liable to change in the resulting composition and molded products thereof with its blending and kneading methods, not to mention the properties and amount of resins to be blended.

Further, even if the foregoing technique on block copolymer is simply applied, no block copolymers having desired properties can be obtained. Thus, no block copolymers having high rigidity and impact resistance well balanced have been found.

SUMMARY OF THE INVENTION

It is therefore an object of the present invention to provide a polypropylene block copolymer or resin composition excellent in impact resistance and rigidity.

The foregoing object of the present invention will become more apparent from the following detailed description and examples.

In order to solve the foregoing problems, the inventors made extensive studies of polypropylene block copolymers and the relationship between the crystal structure, molecular structure, etc. of various blocks constituting these polypropylene block copolymers. As a result, it was found that the foregoing object of the present invention can be accomplished by controlling the properties of these blocks to a predetermined range. The present invention has thus been worked out.

The essence of the present invention lies in a block copolymer comprising one or more blocks of a polymer made of a polypropylene (hereinafter referred to as "PP block") and one or more blocks of a polymer made of an ethylene-propylene copolymer (hereinafter referred to as "EPR block") connected to each other, characterized in that said block copolymer and each of said blocks have the following properties (1) to (7):

(1) The thickness of the interface of PR block with EPR block in the dispersion structure of the block copolymer is from not less than 20 nm to not more than 1,000 nm;

(2) The weight-average molecular weight of the polypropylene in PP block (hereinafter referred to as "$M_{W,PP}$") is from not less than 10,000 to not more than 1,000,000;

(3) The proportion of mesopentad chain in the polypropylene in PP block is not less than 95%;

(4) The particle diameter of the disperse phase of the ethylene-propylene copolymer in EPR block is from not less than 0.2 $\mu$m to not more than 3 $\mu$m as calculated in terms of weight-average area;

(5) The weight-average molecular weight of the ethylene-propylene copolymer in EPR block (hereinafter referred to as "$M_{W,R}$") is from not less than 50,000 to not more than 1,000,000;

(6) The propylene content in the ethylene-propylene copolymer in EPR block is from not less than 20 mol-% to not more than 80 mol-%; and (7) The composition fluctuation in molecular weight of the ethylene-propylene copolymer in EPR block is within ±5% from the average composition.

In another attempt to solve the foregoing problem, the inventors made extensive studies of the crystal structure, dispersion state, etc. of a composition comprising as main components a polypropylene resin (PP resin) and an ethylene-propylene copolymer rubber (EPR). As a result, it was found that the foregoing object of the present invention can be accomplished by controlling predetermined properties of the resin composition and its constituents to a predetermined range. The present invention has thus been worked out.

The essence of the present invention also lies in a resin composition comprising as main components a polypropylene resin and an ethylene-propylene copolymer rubber in an amount of from 5 to 100 parts by weight based on 100 parts by weight of said PP resin, characterized in that said composition and each of said various components have the following properties (1) to (7):

(1) The weight-average molecular weight of PP resin (hereinafter referred as "$M_{W,PP}$") is from not less than 10,000 to not more than 1,000,000;

(2) The proportion of mesopentad chain in PP resin is not less than 95%;

(3) The weight-average molecular weight of EPR (hereinafter referred to as "$M_{W,R}$") is from 50,000 to 1,000,000;

(4) The propylene content in EPR is from not less than 20 mol-% to not more than 80 mol-%;

(5) The fluctuation in molecular weight of EPR is within ±5% from the average composition;

(6) The thickness of the interface of PP resin component with EPR resin component in the dispersion structure of the resin composition is from not less than 20 nm to not more than 1,000 nm; and (7) The particle diameter of the disperse phase of EPR in the resin composition is from not less than 0.2 µm to not more than 10 µm as calculated in terms of weight-average area.

DETAILED DESCRIPTION OF THE INVENTION

The present invention will be further described hereinafter.

The polypropylene block copolymer according to the present invention is characterized by the dispersion state of the interface of PP block with EPR block.

On the other hand, the resin composition according to the present invention is characterized not only by each of its constituent PP resin and EPR components but also by the dispersion state of the various components in the dispersion structure of the composition and the state of the interface of these components.

The properties of these components will be described hereinafter. Since PP block and PP resin have the same characteristics and EPR block and EPR have the same characteristics, PP block and PP resin will be generically termed as "PP moiety" and EPR block and EPR will be generically termed as "EPR moiety".

In other words, the crystal and dispersion structure of block copolymer or resin composition has a lamellar acicular crystal derived from PP moiety penetrating into EPR moiety at the interface of PP moiety with EPR moiety.

In the present invention, the length of the acicular penetration structure (hereinafter referred to as "interface thickness") is controlled to a range of from not less than 20 nm to not more than 1,000 nm.

The interface thickness can be measured as follows.

Using a Type DSC7 differential scanning calorimeter (produced by Perkin Elmer Inc.), a slice cut from a molded product of block copolymer or resin composition is melted at a temperature of 210° C. for 5 minutes, and then cooled at a rate of 10° C./min to prepare a specimen. The specimen is dyed with ruthenium tetraoxide. The specimen is observed under a transmission type electron microscope. The penetration length of the lamellar polypropylene crystal penetrating from the interface which can be recognized as an undyed structure is measured over the periphery of the dispersed layer. The average length is then determined with 10% of the maximum length as lower limit of measurement to give interface thickness. If the molded product shows a local change in dispersion state such as orientation of strength of dispersion in the vicinity of the surface, it is preferred that the evaluation of the interface thickness be effected at the most average portion in the central portion of the molded product.

In the present invention, the interface thickness is from not less than 20 nm to not more than 1,000 nm. If the interface thickness falls below 20 nm, the resulting interface exhibits a reduced strength and hence a reduced low temperature impact strength. On the contrary, if the interface thickness exceeds 1,000 nm, the resulting interface shows a drastic drop of rigidity.

In the present invention, the weight-average molecular weight of polypropylene in PP moiety ($M_{W,PP}$) is from not less than 10,000 to not more than 1,000,000, preferably not less than 50,000 to not more than 800,000, more preferably from 100,000 to 400,000.

If the weight-average molecular weight ($M_{W,PP}$) is too low, the resulting mechanical strength is reduced. On the other hand, if the weight-average molecular weight ($M_{W,PP}$) is too high, the resulting composition exhibits a raised melt viscosity and hence a deteriorated workability during molding. The weight-average molecular weight ($M_{W,PP}$) is measured by gel permeation chromatography (GPC) in polypropylene equivalence.

$M_{W,PP}$ has the following relationship with melt flow rate (hereinafter referred to as "MFR"), which is used as an index of molecular weight, and intrinsic viscosity [η] in orthodichlorobenzene:

$$[\eta]=3.91\times10^{-4}\times M_{W,PP}^{0.7}$$

$$\log(MFR)=2.716-1.1[\eta]$$

The ratio Q of weight-average molecular weight to number-average molecular weight, which is an index of molecular weight distribution, is not specifically limited. If Q exceeds 6, it is likely that the characteristic dispersion state of the present invention cannot be realized. The Q value is preferably from 1.5 to 5.

Referring to the isotactic stereoregularity of PP moiety of the present invention, the proportion of mesopentad chain is not less than 95%, preferably not less than 97%, as measured by NMR spectrum. If the isotactic stereoregularity of PP moiety falls below the above defined range, the resulting crystallinity is reduced to lower the rigidity.

Some preparation processes cause the occurrence of a small amount of an atactic polymer component even if the mesopentad chain as an average is high. The atactic polymer content is not more than 5%, preferably not more than 3%, more preferably not more than 1% as defined in terms of solubility in boiling heptane.

The content of 1,3-addition bond as measured by NMR spectrum is preferably from not less than 0.05 mol-% to not more than 3 mol-%, more preferably from not less than 0.06 mol-% to not more than 2.5 mol-%, even more preferably from not less than 0.2 mol-% to not more than 2.5 mol-%. If the content of 1,3-addition bond exceeds 3 mol-%, the resulting melting point and crystallinity show a drastic drop. On the contrary, if the content of 1,3-addition bond falls below 0.05 mol-%, the rigidity corresponding to density shows a small enhancement.

The term "melting point of PP moiety" as used herein is meant to indicate the peak fusion temperature measured at a heating rate of 10° C./min using a differential scanning calorimeter (DSC).

In the block copolymer or resin composition of the present invention, the melting point of PP moiety is preferably from not lower than 140° C. to not higher than 170° C. because the desired fusion strength can be maintained by low melting point and low crystallization latent heat at the secondary forming step utilizing friction fusion, secondary injection fusion, etc. If the melting point of PP moiety is too low, the heat resistance as a characteristic of polypropylene is deteriorated, limiting the purpose. On the contrary, if the melting point of PP moiety is too high, the resulting composition can be hardly melted and worked during molding.

The particle diameter as calculated in terms of weight-average area as an index of dispersion form in the dispersion state of EPR moiety in the block copolymer or resin composition of the present invention is from not less than 0.2 µm to not more than 3 µm.

The particle diameter of EPR moiety as calculated in terms of circle corresponding to weight-average area is determined by observation under scanning type electron microscope, transmission type electron microscope, optical microscope or the like. The area of particles derived from EPR moiety in the observed image is determined. The area is then converted to diameter as calculated in terms of circle corresponding to area to determine the diameter of dispersed particles. The field of view for observation is predetermined such that 100 or more dispersion particles can be detected. The particle diameter of EPR moiety as calculated in terms of circle corresponding to weight-average area is calculated from the diameter of 100 or more dispersion particles. For the evaluation of particle diameter, a commercially available image analyzer can be used.

If the particle diameter of EPR moiety falls below 0.2 μm, the effect of enhancing impact resistance is small. On the contrary, if the particle diameter of EPR moiety exceeds 3 μm, the resulting rigidity become worse.

The term "long period L of crystal structure" as used herein is meant to indicate the period of repetition of crystal and amorphous determined by small angle X-ray scattering based on the model structure comprising a laminate of lamellar polypropylene resin crystals. For the detail of measuring process, reference can be made to "Macro Molecular Experiment 16: Structure of Macro Molecular Solid Structure II", Kyoritsu Shuppan, 1984. The measuring process will be summarized as follows.

In some detail, the value of s ($s_{mx}$) which gives the maximum value on the curve obtained by plotting $I(s) \times s^2$, where s is scattering vector given by the equation $s = 2 \sin \theta / \lambda$ ($\lambda$ is wavelength) supposing that the scattering angle at the measurement of X-ray scattering is $2\theta$ and $I(s)$ is the scattering intensity against s is determined. The long period L of the crystal structure is given by the equation $L = 1/s_{mx}$ herein. The specimen to be measured is preferably prepared by melting the resin composition at a temperature of 260° C. for 10 minutes and then compression-molding the material to a thickness of 1 mm using a hot press molding machine, and then immediately cooling the material with water. In the present invention, the long period L is preferably from not less than 10 nm to not more than 15 nm.

In the present invention, the weight-average molecular weight of EPR moiety ($M_{WR}$) is from not less than 50,000 to not more than 1,000,000 as measured by gel permeation chromatography (GPC). If $M_{WR}$ exceeds 1,000,000, the resulting resin composition exhibits a deteriorated fluidity during hot molding, giving a molded product with a worsened external appearance. On the contrary, if $M_{WR}$ falls below 50,000, a sufficient effect of enhancing the impact resistance cannot be exerted. A preferred range of $M_{WR}$ is from 100,000 to 800,000.

Referring further to molecular weight distribution determined by GPC, EPR moiety has a component having a molecular weight of not more than 10,000 preferably in a proportion of not more than 10%, more preferably not more than 5%. If the foregoing low molecular component is present in a proportion of more than 10%, it induces the drop of elastic modulus of PP moiety that deteriorates the rigidity of the block copolymer or resin composition.

In the block copolymer or resin composition according to the present invention, the propylene content in EPR moiety is from not less than 20 mol-% to not more than 80 mol-%, preferably from not less than 30 mol-% to not more than 75 mol-%. If the propylene content falls below 20 mol-%, EPR moiety exhibits a reduced compatibility with the polypropylene in PP moiety, causing an extreme drop of affinity at the interface of polypropylene with ethylene-propylene copolymer and hence interfacial exfoliation accompanied by deterioration of mechanical properties. On the contrary, if the propylene content exceeds 80 mol-%, EPR moiety exhibits a raised affinity for polypropylene, causing the rubber to be dispersed too finely to effectively exert the effect of concentrating stress onto the ethylene-propylene copolymer disperse phase as a main toughening mechanism. Further, the ethylene-propylene copolymer component exhibits a raised glass transition temperature that makes itself liable to drop of low temperature impact strength or brittle at raised temperatures.

The propylene content in EPR moiety can be determined by nuclear magnetic resonance spectrum ($^{13}$C-NMR).

The composition ratio of ethylene to propylene in the ethylene-propylene copolymer may change with the molecular weight of the ethylene-propylene copolymer. If this composition ratio is distributed depending on the molecular weight of the ethylene-propylene copolymer, the interface of PP moiety with EPR moiety as a characteristic of the present invention may have a reduced or no thickness.

In the present invention, the fluctuation of composition with the molecular weight of the ethylene-propylene copolymer in EPR moiety is controlled to a range of within ±5%, preferably within ±3% from the average composition.

The fluctuation of composition in molecular weight can be determined by subjecting polymers fractionated by molecular weight to measurement for composition by infrared absorption spectroscopy or nuclear magnetic resonance spectroscopy. Experimentally, it is a simple method to measure the ratio of infrared characteristic absorption of ethylene unit to propylene unit by means of an infrared detector connected to a GPC flow cell.

In the present invention, EPR moiety preferably shows an absorption maxima when the mechanical loss tangent angle (tan δ) ranges from not less than −65° C. to not more than −30° C. as evaluated by the temperature dispersion of dynamic behavior. Further, the half-width of the absorption curve is preferably not more than 20 degrees. If the dispersion temperature is high, the resulting effect of improving impact strength at a temperature as low as −30° C. is small. On the other hand, in order to predetermine the mechanical loss tangent angle to not more than −70° C., it is necessary that the ethylene content be not more than 80%. In this case, however, crystallinity due to ethylene chain appears to impair the rubber properties of the resin composition and hence lessen the effect of improving impact strength. The width of transition temperature during dispersion changes with the intermolecular and intramolecular distribution of the composition of the copolymer. A resin composition having such a wide composition distribution that the half-width of transition temperature exceeds 20 degrees show s no increase of interface thickness in dispersion as characterized in the present invention and a small improvement in low temperature impact strength.

The polymerization catalyst for use in the preparation of the block copolymer, PP resin or EPR according to the present invention is not specifically limited so far as it allows the preparation of block copolymers or resin compositions satisfying the foregoing requirements. We can use the conventional $TiCl_3$ type catalysts, magnesium supported $TiCl_4$ type catalysts, and Metallocene type catalysts so far as satisfying the foregoing requirements. In practice, however, as a preferred catalyst there may be used a catalyst for α-olefin polymerization comprising the following component (A) and component (B) or component (C):

Component (A): Transition metal compound represented by the following general formula [1]:

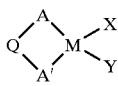

[1]

wherein A and A' may be the same or different and each represent a conjugated 5-membered ring ligand; Q represents a bonding group which crosslinks the two conjugated 5-membered ring ligands represented by A and A' at arbitrary position; M represents a metal atom selected from the group consisting of elements belonging to the groups 4 to 6 in the periodic table; and X and Y each represent the same or different atom or group selected from the group consisting of hydrogen atom, halogen atom, hydrocarbon group, alkoxy group, amino group, phosphor-containing hydrocarbon group and silicon-containing hydrocarbon group; and Component (B): At least one compound selected from the group consisting of:

(a) Aluminumoxy compound;

(b) Lewis acid; and (c) Ionic compound capable of reacting with Component (A) to convert Component (A) to cation.

In the crosslinked metalocene-based transition metal compound, A and A' may be the same or different in the same compound and each represent a conjugated 5-membered ring ligand as mentioned above. A specific example of the conjugated 5-membered ring ligand is a conjugated 5-membered ring ligand, i.e., cyclopentadienyl group. The cyclopentadienyl group may have four hydrogen atoms (all the bonding positions except crosslinking positions) [$C_5H_4$—]. Further, the cyclopentadienyl group may be used in the form of derivative thereof, i.e., cyclopentadienyl group having some of its constituent hydrogen atoms substituted by substituents. An example of substituents is a $C_{1-20}$, preferably $C_{1-12}$ hydrocarbon group. Such a hydrocarbon group may be bonded to the cyclopentadienyl group as a monovalent group. Alternatively, if a plurality of such hydrocarbon groups are present, two or these hydrocarbon groups may be connected to each other at its end (ω-end) to form a ring with a part of the cyclopentadienyl group. Examples of the latter connection include connection comprising two substituents connected to each other at its ω-end to form a condensed 6-membered ring with two adjacent carbon atoms in the cyclopentadienyl group shared therewith, such as indenyl group, tetrahydroindenyl group and fluorenyl group, and connection comprising two substituents connected to each other at its ω-end to form a condensed 7-membered ring with two adjacent carbon atoms in the cyclopentadienyl group shared therewith, such as azulenyl group, hydroazulenyl group and tetrahydroazulenyl group.

To summarize, examples of the conjugated 5-membered ring ligand represented by A or A' include substituted or unsubstituted cyclopentadienyl group, indenyl group, fluorenyl group, hydroazulenyl group, and azulenyl group. Preferred among these conjugated 5-membered ring ligands is substituted or unsubstituted hydroazulenyl group.

Examples of the substituents on the cyclopentadienyl group, etc. include the foregoing $C_{1-20}$, preferably $C_{1-12}$ hydrocarbon group, halogen atom such as fluorine, chlorine and bromine, $C_{1-12}$ alkoxy group, $C_{1-24}$ silicon-containing hydrocarbon group such as trialkylsilyl group, $C_{1-18}$ phosphor-containing hydrocarbon group such as dialkylphosphine group, $C_{1-18}$ nitrogen-containing hydrocarbon group such as dialkylamino group, $C_{1-18}$ boron-containing hydrocarbon group such as dialkylboron group, and $C_{1-20}$, preferably $C_{1-12}$ hydrocarbon group containing halogen, oxygen or sulfur. If a plurality of such substituents are present, they may be the same or different or may be connected to each other to form a cyclic substituent.

Specific examples of the bonding group Q which crosslinks the two conjugated 5-membered ring ligands represented by A and A' at arbitrary position will be given below.

(a) $C_{1-20}$ Alkylene groups such as methylene group, ethylene group, isopropylene group, phenylmethylmethylene group, diphenylmethylene group and cyclohexylene;

(b) Silylene groups such as silylene group, dimethylsilylene group, phenylmethylsilylene group, diphenylsilylene group, disilylene group and tetramethyldisilylene group; and (c) Hydrocarbon groups containing germanium, phosphor, nitrogen, boron or aluminum, such as $(CH_3)_2Ge$, $(C_6H_5)_2Ge$, $(CH_3)P$, $(C_6H_5)P$, $(C_4H_9)N$, $(C_6H_5)N$, $(CH_3)B$, $(C_4H_9)B$, $(C_6H_5)B$, $(C_6H_5)Al$ and $(CH_3O)Al$.

Preferred among these bonding groups are alkylene groups, silylene groups and germylene groups.

M represents a metal atom selected from the group consisting of elements belonging to the groups 4 to 6 in the periodic table, preferably a metal atom belonging to the group 4 in the periodic table such as titanium, zirconium and hafnium, particularly zirconium or hafnium.

X and Y each represent a hydrogen atom, halogen atom, $C_{1-20}$, preferably $C_{1-10}$ hydrocarbon group, $C_{1-20}$, preferably $C_{1-10}$ alkoxy group, amino group, $C_{1-20}$, preferably $C_{1-10}$ nitrogen-containing hydrocarbon group, $C_{1-20}$, preferably $C_{1-12}$ phosphor-containing hydrocarbon group such as diphenylphosphine group, or $C_{1-20}$, preferably $C_{1-12}$ silicon-containing hydrocarbon group such as trimethylsilyl group and bis(trimethylsilyl)methyl group. X and Y may be the same or different. Preferred among these groups are halogen atom, $C_{1-8}$ hydrocarbon group, and $C_{1-12}$ nitrogen-containing hydrocarbon group.

A preferred example of Component (A) represented by the general formula [1] constituting the foregoing catalyst for olefin polymerization consists of the following constituents:

A, A': Cyclopentadienyl group, n-butyl-cyclopentadienyl group, indenyl group, 2-methyl-indenyl group, 2-methyl-4-phenylindenyl group, tetrahydroindenyl group, 2-methyl-tetrahydroindenyl group, 2-methylbenzoindenyl group, 2,4-dimethylhydroazulenyl group, 2-methyl-4-phenylhydroazulenyl group, 2-methyl-4-naphthylhydroazulenyl group, 2-ethyl-4-naphthylhydroazulenyl group, 2-ethyl-4-phenylhydroazulenyl group, 2-methyl-4-(4-chlorophenyl)hydroazulenyl group;

Q: Ethylene group, dimethylsilylene group, isopropylidene group;

M: Transition metal atom belonging to the group 4 in the periodic table;

X, Y: Chlorine atom, methyl group, phenyl group, benzyl group, diethylamino group Particularly preferred among the groups represented by A or A' are 2,4-dimethylhydroazulenyl group, 2-methyl-4-phenylhydroazulenyl group, 2-methyl-4-naphthylhydroazulenyl group, 2-ethyl-4-naphthylhydroazulenyl group, 2-ethyl-4-phenylhydroazulenyl group, 2-isopropyl-4- naphthylhydroazulenyl group and 2-methyl-4-(4-chlorophenyl)hydroazulenyl group.

Specific examples of the transition metal compound will be given below. Examples of the transition metal compound wherein Q is an alkylene group include (1) methylenebis(2-methyl-4-phenyl-4-hydroazulenyl)zirconium dichloride, (2) ethylenebis(2-methyl-4-phenyl-4-hydroazulenyl)zirconium dichloride, (3) ethylenebis(2-methyl-4-phenyl-4-hydroazulenyl)zirconium hydride monochloride, (4) ethylenebis(2-methyl-4-phenyl-4-hydroazulenyl)methyl zirconium monochloride, (5) ethylenebis(2-methyl-4-phenyl-4-hydroazulenyl)zirconium monomethoxy monochloride, (6) ethylenebis(2-methyl-4-phenyl-4-hydroazulenyl)zirconium diethoxide, (7) ethylenebis(2-methyl-4-phenyl-4-hydroazulenyl)zirconium dimethyl, (8) ethylenebis(2-methylindenyl)zirconium dichloride, (9) ethylenebis(2-methyl-4,5,6,7-tetrahydroindenyl)zirconium dichloride, (10) ethylenebis(2-ethylindenyl)zirconium dichloride, (11) ethylenebis(2,4-dimethylindenyl)zirconium dichloride, (12) ethylenebis(2,4-dimethylcyclopentadienyl)(3',5'-dimethylcyclopentadienyl)zirconium dichloride, (13) ethylene(2-methyl-4-tert-butylcyclopentadienyl)(3'-tert-butyl-5'-methyl cyclopentadienyl)zirconium dichloride, (14) ethylene(2,3,5-trimethylcyclopentadienyl)(2',4',5'-trimethyl cyclopentadienyl)zirconium dichloride, (15) ethylene-1,2-bis(4-indenyl)zirconium dichloride, (16) ethylene-1,2-bis[4-(2,7-dimethylindenyl)]zirconium dichloride, (17) ethylenebis(4-phenylindenyl)zirconium dichloride, (18) ethylenebis[1,1'-(4-hydroazulenyl)]zirconium dichloride, (19) ethylenebis[1,1'-(2-ethyl-4-phenyl-4-hydroazulenyl)]zirconium dichloride, (20) ethylenebis[1,1'-(2-methyl-4-(4-chlorophenyl)-4-hydroazulenyl)]zirconium dichloride, (21) ethylenebis(9-bicyclo[8.3.0.]trideca-2-methylpentadienyl)zirconium dichloride, (22) ethylene(1-indenyl)[1-(4-hydroazulenyl)]zirconium dichloride, (23) isopropylidenebis(2-methyl-4-phenyl-4-hydroazulenyl)zirconium dichloride, (24) isopropylidene(2,4-dimethylcyclopentadienyl)(3',5'-dimethylcyclopentadienyl)zirconium dichloride, and (25) isopropylidene(2-methyl-4-tert-butylcyclopentadienyl)(3'-tert-butyl-5-methylcyclopentadienyl)zirconium dichloride.

Specific examples of the transition metal compound wherein Q is a silylene group include (1) dimethylsilylenebis(2-methylindenyl)zirconium dichloride, (2) dimethylsilylenebis(2-methyl-4,5,6,7-tetrahydroindenyl)zirconium dichloride, (3) dimethylsilylenebis(2-methyl-4,5-benzoindenyl)zirconium dichloride, (4) dimethylsilylenebis(2-methyl-4-phenylindenyl)zirconium dichloride, (5) dimethylsilylenebis(2,4-dimethyl-4-hydroazulenyl)zirconium dichloride, (6) dimethylsilylenebis(2-methyl-4-phenyl-4,5,6,7,8-pentahydroazulenyl)zirconium dichloride, (7) dimethylsilylene(2,4-dimethylcyclopentadienyl)(3',5'-dimethylcyclopentadienyl)zirconium dichloride, (8) dimethylsilylenebis(2-ethyl-4-phenyl-4-hydroazulenyl)zirconium dichloride, (9) dimethylsilylenebis(2-methyl-4,4-dimethyl-4,5,6,7-tetrahydro-4-silaindenyl)zirconium dichloride, (10) dimethylsilylenebis[4-(2-phenylindenyl)]zirconium dichloride, (11) dimethylsilylenebis[4-(2-tert-butylindenyl)]zirconium dichloride, (12) dimethylsilylenebis[4-(1-phenyl-3-methylindenyl)]zirconium dichloride, (13) dimethylsilylenebis[4-(2-phenyl-3-methylindenyl)]zirconium dichloride, (14) phenylmethylsilylenebis(2-methyl-4-phenyl-4-hydroazulenyl)zirconium dichloride, (15) phenylmethylsilylenebis(2-methyl-4-phenyl-4,5,6,7,8-pentahydroazulenyl)zirconium dichloride, (16) phenylmethylsilylene(2,4-dimethyl cyclopentadienyl)(3',5'-dimethylcyclopentadienyl)zirconium dichloride, (17) diphenylmethylsilylenebis(2-methyl-4-phenyl-4-hydroazulenyl)zirconium dichloride, (18) tetramethyl disilylenebis(2-methyl-4-phenyl-4-hydroazulenyl) zirconium dichloride, (19) dimethylsilylenebis[1,1'-(2-isopropyl-4-phenyl-4-hydroazulenyl)zirconium dichloride, (20) dimethyl silylenebis[1,1'-(2-ethyl-4-naphthyl-4-hydroazulenyl)]zirconium dichloride, (21) dimethylsilylenebis[1,1'-(2-methyl-4-(4-chlorophenyl)-4-hydroazulenyl)]zirconium dichloride, (22) dimethylsilylenebis(9-bicyclo[8.3.0]trideca-2-methylpentaenyl)zirconium dichloride, and (23) (methyl)(phenyl)silylenebis[1,1'-(2-methyl-4-hydroazulenyl)]zirconium dichloride.

Specific examples of the transition metal compound wherein Q is a hydrocarbon group containing germanium, phosphor, nitrogen, boron or aluminum include (1) dimethyl germaniumbis(2-methyl-4-phenyl-4-hydroazulenyl)zirconium dichloride, (2) methylaluminumbis(2-methyl-4-phenyl-4-hydroazulenyl)zirconium dichloride, (3) phenylaluminumbis(2-methyl-4-phenylazulenyl)zirconium dichloride, (4) phenylphosphinobis(2-methyl-4-phenyl-4-hydroazulenyl)zirconium dichloride, (5) ethylboranobis(2-methyl-4-phenylazulenyl)zirconium dichloride, and (6) phenylaminobis(2-methyl-4-phenyl-4-hydroazulenyl)zirconium dichloride.

Further, compounds obtained by replacing the chlorine atom in the foregoing compounds by bromine atom, iodine atom, hydride group, methyl group, phenyl group, etc. may be used. Moreover, compounds obtained by replacing the central metal in the foregoing zirconium compounds exemplified as Component (A) by titanium, niobium, molybdenum or tungsten may be used.

Preferred among these compounds are zirconium compounds, hafnium compounds and titanium compounds. Particularly preferred among these compounds are zirconium compounds and hafnium compounds.

Two or more of these components (A) may be used in combination. The same or different component (A) may be further added at the end of the first stage of polymerization or before the initiation of the second stage of polymerization.

As Component (B) there may be used one or more materials selected from the group consisting of aluminumoxy compound, Lewis acid and ionic compound capable of reacting with Component (A) to convert Component (A) to cation. Some Lewis acids may act as an ionic compound capable of reacting with Component (A) to convert Component (A) to cation. Accordingly, it may be interpreted that a compound belonging to both the foregoing Lewis acid and ionic compound belongs to any one of the two groups.

Specific examples of the foregoing aluminumoxy compound include compounds represented by the following general formulae [2], [3] and [4]:

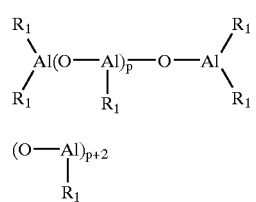

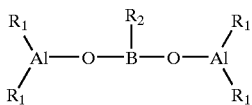

[4]

In these general formulae, $R_1$ represents a hydrogen atom or hydrocarbon group, preferably a $C_{1-10}$, particularly $C_{1-6}$ hydrocarbon group. The plurality of $R_1$'s may be the same or different. The suffix p represents an integer of from 0 to 40, preferably from 2 to 30.

The compound represented by the foregoing general formula [2] or [3] is a compound also called aluminoxane. It can be obtained by the reaction of one or more trialkyl aluminums with water. Specific examples of such an aluminoxane include methyl aluminoxane, ethyl aluminoxane, propyl aluminoxane, butyl aluminoxane, isobutyl aluminoxane, methyl ethyl aluminoxane, methyl butyl aluminoxane, and methyl isobutyl aluminoxane. Preferred among these aluminoxanes are methyl aluminoxane and methyl isobutyl aluminoxane.

A plurality of these aluminoxanes may be used in combination.

The compound represented by the foregoing general formula [4] can be obtained by the reaction of one or more trialkyl aluminums with an alkylboronic acid represented by the following general formula [5]:

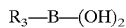

[5]

wherein $R_3$ represents a $C_{1-10}$, preferably $C_{1-6}$ hydrocarbon group or halogenated hydrocarbon group.

Specific examples of such a compound will be given below.

(a) 2:1 reaction product of trimethyl aluminum and methylboronic acid;

(b) 2:1 reaction product of triisobutyl aluminum and methylboronic acid;

(c) 1:1:1 reaction product of trimethyl aluminum, triisobutyl aluminum and methylboronic acid;

(d) 2:1 reaction product of trimethyl aluminum and ethylboronic acid; and (e) 2:1 reaction product of triethyl aluminum and butylboronic acid Examples of Lewis acid include various organic boron compounds, metal halide compounds, and solid acids. Specific examples of these compounds will be given below.

(a) Organic boron compounds such as triphenylboron, tris(3,5-difluorophenyl)boron and tris(pentafluorophenyl);

(b) Metal halide compounds such as aluminum chloride, aluminum bromide, aluminum iodide, magnesium chloride, magnesium bromide, magnesium iodide, magnesium bromochloride, magnesium chloroiodide, magnesium bromoiodide, magnesium chloride hydride, magnesium chloride hydroxide, magnesium bromide hydroxide, magnesium chloride alkoxide and magnesium bromide alkoxide; and (c) Solid acids such as alumina and silica-alumina As the ionic compound capable of reacting with Component (A) to convert Compound (A) to cation there may be used a compound represented by the following general formula [6]:

[6]

In the foregoing general formula [6], K represents a cation component such as carbonium cation, tropilium cation, ammonium cation, oxonium cation, sulfonium cation and phosphonium cation. Further examples of the cation include cation of metal which can be easily reduced itself and organic metal cation.

Specific examples of the foregoing cation include triphenyl carbonium cation, diphenyl carbonium cation, cyclopentatrienium cation, indenium cation, triethyl ammonium cation, tripropyl ammonium cation, tributyl ammonium cation, N,N-dimethylanilium cation, dipropyl ammonium cation, dicyclohexyl ammonium cation, triphenyl phosphonium cation, trimethyl phosphonium cation, tris(dimethylphenyl)phosphonium cation, tris(methylphenyl)phosphonium cation, triphenyl sulfonium cation, triphenyl oxonium cation, triethyl oxonium cation, pyrilium cation, silver ion, gold ion, platinum ion, palladium ion, mercury ion, and pherocenium ion.

In the foregoing general formula [6], Z represents an anion component which is a counter anion (normally non-coordination component) to the cation seed obtained by conversion of the component (A). Examples of Z include organic boron compound anion, organic aluminum compound anion, organic gallium compound anion, organic phosphor compound anion, organic arsenic compound anion, and organic antimony compound anion.

Specific examples of these anions will be given below.

(a) Tetraphenyl boron anion, tetrakis(3,4,5-trifluorophenyl)boron anion, tetrakis{3,5-bis(trifluoromethyl)phenyl}boron anion, tetrakis{3,5-di(t-butyl)phenyl}boron anion, tetrakis(pentafluorophenyl)boron anion, etc.;

(b) Tetraphenyl aluminum anion, tetrakis(3,4,5-trifluorophenyl)aluminum anion, tetrakis{3,5-bis(trifluoromethyl)phenyl}aluminum anion, tetrakis(3,5-di(t-butyl)phenyl)aluminum anion, tetrakis(pentafluorophenyl)aluminum anion, etc.;

(c) Tetraphenyl gallium anion, tetrakis(3,4,5-trifluorophenyl)gallium anion, tetrakis{3,5-bis(trifluoromethyl)phenyl}gallium anion, tetrakis{3,5-di(t-butyl)phenyl}gallium anion, tetrakis(pentafluorophenyl)gallium anion, etc.;

(d) Tetraphenyl phosphor anion, tetrakis(pentafluorophenyl)phosphor anion;

(e) Tetraphenyl arsenic anion, tetrakis(pentafluorophenyl)arsenic anion, etc.;

(f) Tetraphenyl antimony anion, tetrakis(pentafluorophenyl)antimony anion, etc.; and (g) Decaborate anion, undecaborate anion, carbadodecaborate anion, decachlorodecaborate anion, etc.

As Component (C) to be used herein there may be used an ion-exchangeable layer compound other than silicate or inorganic silicate. The term "ion-exchangeable layer compound other than silicate" as used herein is meant to indicate a compound having a crystal structure comprising a parallel laminate of planes made of ion bond or the like which are weakly bonded to each other. The ions contained in the ion exchangeable layer compound can be exchanged.

Examples of the foregoing ion-exchangeable layer compound other than silicate include ionic crystalline compounds of hexagonal closest packing type, antimony type, $CdCl_2$ type and $CdI_2$ type, which have a layer crystal structure. Specific examples of such an ionic crystalline compound include crystalline salt of polyvalent metals such as $\alpha$-Zr(HAsO$_4$)$_2 \cdot$H$_2$O, $\alpha$-Zr(HPO$_4$)$_2$, $\alpha$-Zr(KPO$_4$)$_2 \cdot$3H$_2$O, $\alpha$-Ti(HPO$_4$)$_2$, $\alpha$-Ti(HAsO$_4$)$_2 \cdot$H$_2$O, $\alpha$-Sn(HPO$_4$)$_2 \cdot$H$_2$O, $\gamma$-Zr(HPO$_4$)$_2$, $\gamma$-Ti(HPO$_4$)$_2$ and $\gamma$-Ti(NH$_4$PO$_4$)$_2 \cdot$H$_2$O.

Examples of the foregoing inorganic silicate include clay, clay mineral, zeolite, and diatomaceous earth. These inorganic silicates may be in the form of synthetic product or naturally occurring mineral.

Specific examples of clay and clay mineral include allophane group such as allophane, kaolin group such as dickite, nacrite, kaolinite and anauxite, halloysite group such as metahalloysite and halloysite, serpentine group such as chrysotile, lizardite and antigorite, smectite such as montmorillonite, sauconite, beidellite, nontronite, saponite and hectrite, vermiculite mineral such as vermiculite, mica mineral such as illite, sericite and glauconite, attapulgite, sepiolite, palygorskite, bentonite, kibushi clay, gairome clay, hisingerite, pyrophyllite, and chlorite group. These clays or clay minerals may form a mixture layer.

Examples of the artificial synthetic products include synthetic mica, synthetic hectrite, synthetic saponite, and synthetic taeniolite.

Preferred among the foregoing inorganic silicates are kaolin group such as dickite, nacrite, kaolinite and anorthitie, halloysite group such as metahalloysite and halloysite, serpentine group such as chrysotile, lizardite and antigorite, smectite such as montmorillonite, sauconite, beidellite, nontronite, saponite and hectrite, vermiculite mineral such as vermiculite, mica mineral such as illite, sericite and glauconite, synthetic mica, synthetic hectrite, synthetic saponite, and synthetic taeniolite. Particularly preferred among these inorganic silicates are smectite such as montmorillonite, sauconite, beidellite, nontronite, saponite and hectrite, vermiculite mineral such as vermiculite, synthetic mica, synthetic hectrite, synthetic saponite, and synthetic taeniolite. These inorganic silicates may be used untreated or after treatment by ball mill, sifting, etc. These inorganic silicates may be used singly or in admixture.

The foregoing inorganic silicate may be optionally subjected to treatment with a salt and/or acid to change the solid acid strength. The treatment with a salt may be effected such that an ion complex, molecular complex, organic derivative, etc. is formed, making it possible to change the surface area or interlayer distance of the inorganic silicate. In some detail, exchangeable ions between layers can be exchanged with other bulky ions by making the use of ion exchangeability to obtain a layer substance having a raised interlayer distance.

The exchangeable metal cations contained in the compounds which have not been subjected to the foregoing treatment are preferably exchanged with cations separated from the following salt and/or acid.

The foregoing salt to be used in ion exchange is a compound containing cations comprising at least one atom selected from the group consisting of atoms belonging to the groups 1 to 14, preferably a compound made of cations comprising at least one atom selected from the group consisting of atoms belonging to the groups 1 to 14 and anions derived from at least one atom or atomic group selected from the group consisting of halogen atom, inorganic acid and organic acid, more preferably a compound made of cations comprising at least one atom selected from the group consisting of atoms belonging to the groups 1 to 14 and at least one anion selected from the group consisting of Cl, Br, I, F, $PO_4$, $SO_4$, $NO_3$, $CO_3$, $C_2O_4$, $ClO_4$, $OOCCH_3$, $CH_3COCHCOCH_3$, $OCl_2$, $O(NO_3)_2$, $O(ClO_4)_2$, $O(SO_4)$, OH, $O_2Cl_2$, $OCl_3$, OOCH and $OOCCH_2CH_3$. Two or more of these salts may be used in combination.

As the foregoing acid to be used in ion exchange there is preferably used one or more selected from the group consisting of hydrochloric acid, sulfuric acid, nitric acid and oxalic acid. If treatment with a salt and treatment with an acid are effected in combination, the order of the execution of these treatments may be properly predetermined. Alternatively, these treatments may be effected at the same time. The treatment with an acid has an effect of exchanging ions and removing surface impurities as well as eluting some cations such as Al, Fe, Mg and Li ions from the crystal structure.

The conditions under which treatment with a salt and treatment with an acid are effected are not specifically limited.

In practice, however, these treatments are preferably effected with a salt and an acid each in a concentration of from 0.1 to 30% by weight at a temperature of from room temperature to the boiling point of the solvent used for from 5 minutes to 24 hours under conditions such that the compound to be treated is partially eluted. The salt and acid are normally used in the form of aqueous solution.

The foregoing treatment with a salt or acid, if effected, may be preceded, accompanied or followed by grinding or granulation. Alternatively, other chemical treatments such as treatment with an alkali, organic compound, etc. may be effected as well. Component (C) thus obtained preferably has pores having a radius of not less than 20 Å as determined by mercury penetration method in a volume proportion of not less than 0.1 cc/g, particularly from 0.3 to 5 cc/g.

Clay or clay mineral normally contains adsorbed water and interlayer water. The term "adsorbed water" as used herein is meant to indicate water adsorbed by the surface of the ion exchangeable layer compound or inorganic silicate or the fractured surface of crystal. The term "interlayer water" as used herein is meant to indicate water present between layers of the crystal.

In the present invention, Component (C) is preferably freed of such an adsorbed water and interlayer water before use. The process for the removal of such an adsorbed water and interlayer water is not specifically limited. In practice, however, dehydration under heating, dehydration under heating in a gas flow, dehydration under heating and reduced pressure or dehydration under azeotropy with an organic solvent may be used. The heating temperature is such that adsorbed water and interlayer water are not left behind. It is normally not lower than 100° C., preferably not lower than 150° C. However, it should not be so high as to cause structural failure of clay or clay mineral. The heating time is not less than 0.5 hours, preferably not less than 1 hour. The weight loss of Component (C) after dehydration is preferably not more than 3% by weight if it is subjected to suction at a temperature of 200° C. under a pressure of 1 mmHg for 2 hours. In the present invention, if Component (C) the weight loss of which has been adjusted to not more than 3% by weight is used, it is preferably kept in the same conditions during contact with the essential component (A) and an organic aluminum compound described later as an optional component.

In the present invention, an organic aluminum compound may be used in addition to Component (A) and Component (B) or Component (A) and Component (C). A preferred example of the organic aluminum compound to be used herein is represented by the following general formula [7]:

$$AlR_aJ_{3-a} \qquad [7]$$

In the foregoing general formula [7], R represents a $C_{1-20}$ hydrocarbon group, J represents a hydrogen atom, halogen atom, alkoxy group or siloxy group, and the suffix a represents a number of from more than 0 to not more than 3. Specific examples of the organic aluminum compound represented by the general formula [7] include trialkyl aluminum such as trimethyl aluminum, triethyl aluminum, tripropyl aluminum and triisobutyl aluminum, and halogen- or alkoxy-containing alkyl aluminum such as diethyl aluminum monochloride and diethyl aluminum monomethoxide. Preferred among these organic aluminum compounds is trialkyl aluminum. If no aluminoxane is used as Component (B), aluminoxane such as methyl aluminoxane may be used.

The catalyst for use in the preparation of the propylene block copolymer or PP resin of the present invention can be prepared by allowing the foregoing essential component (A) and component (B) or component (A) and component (C) and optionally the foregoing organic aluminum compound to come in contact with each other. The contact of these components may be effected simultaneously or successively. The order of addition of these components is not specifically limited. The contact of these components may be effected not only during the preparation of catalyst but also during prepolymerization or polymerization.

The contact of the foregoing various components may be accompanied or followed by the presence or contact of a polymer such as polyethylene and polypropylene or an inorganic solid oxide such as silica and alumina.

The contact of the foregoing various components may be effected in an inert gas such as nitrogen and an inert hydrocarbon solvent such as pentane, hexane, heptane, toluene and xylene. The contact of these components is effected preferably at a temperature of from −20° C. to the boiling point of the solvent used, particularly from room temperature to the boiling point of the solvent used.

The amount of Component (A) and Component (B) or Component (C) to be used are not specifically limited. For example, in the case of solvent polymerization, the amount of Component (A) to be used is normally from $10^{-7}$ to $10^2$ mmol/l, preferably from $10^{-4}$ to 1 mmol/l as calculated in terms of transition metal atom. If an aluminumoxy compound is used as Component (B), the molar ratio of Al/transition metal is normally from 10 to $10^5$, preferably from 100 to $2\times10^4$, more preferably from 100 to $10^4$. Alternatively, if an ionic compound or Lewis acid is used as Component (B), the molar ratio of such an ionic compound or Lewis acid to transition metal is normally from 0.1 to 1,000, preferably from 0.5 to 100, more preferably from 1 to 50.

If an ion-exchangeable layer compound other than silicate or an inorganic silicate is used as Component (C), the amount of Component (A) to be used per g of Component (C) is normally from $10^{-4}$ to 10 mmol, preferably from $10^{-3}$ to 5 mmol. Further, the amount of an organic aluminum compound, if used, is normally from 0.01 to $10^4$ mmol, preferably from 0.1 to 100 mmol. The atomic ratio of aluminum to transition metal in Component (A) is normally from 1:0.01 to $10^6$, preferably from 1:0.1 to $10^5$.

The catalyst thus prepared may or may not be washed before use. If necessary, an organic aluminum compound may be additionally used. In other words, if Component (A) and Component (B) are used in combination with an organic aluminum compound to prepare a catalyst, another organic aluminum compound may be added to the reaction system separately from the preparation of catalyst. The amount of the organic aluminum compound to be used herein is predetermined to be from 1:0.01 to $10^4$ as calculated in terms of atomic ratio of aluminum in the organic aluminum compound to transition metal in Component (A).

A particulate carrier may be present in addition to the foregoing various components. The particulate carrier to be used herein is one made of an inorganic or organic compound having a particle diameter of normally from 5 μm to 5 mm, preferably from 10 μm to 2 mm.

Examples of the foregoing carrier include oxides such as $SiO_2$, $Al_2O_3$, MgO, ZrO, $TiO_2$, $B_2O_3$ and ZnO, and composite oxides such as $SiO_2$—MgO, $SiO_2$—$Al_2O_3$, $SiO_2$—$TiO_2$, $SiO_2$—$Cr_2O_3$ and $SiO_2$—$Al_2O_3$—MgO.

Examples of the foregoing organic carrier include a particulate carrier of porous polymer made of (co)polymer of $C_{2-14}$ α-olefin such as ethylene, propylene, 1-butene and 4-methyl-1-pentene or (co)polymer of aromatic unsaturated hydrocarbon such as styrene and divinylbenzene. Such a particulate carrier normally has a specific surface area of from 20 to 1,000 $m^2/g$, preferably from 50 to 700 $m^2$, and a pore volume of not less than 0.1 $cm^2/g$, preferably not less than 0.3 $cm^2/g$, more preferably not less than 0.8 $cm^2/g$.

The catalyst employable herein may comprise an active hydrogen-containing compound such as $H_2O$, methanol and butanol, an electron donative compound such as ether, ester and amine or an alkoxy-containing compound such as phenyl borate, dimethylmethoxy aluminum, phenyl phosphite, tetraethoxysilane and diphenyldimethoxysilane incorporated therein. The preparation of the propylene block copolymer of the present invention is normally carried out by two or more stages. The polymerization reaction may be effected in the form of solvent polymerization using an inert hydrocarbon such as propane, butane, hexane, heptane and toluene or solvent such as liquefied α-olefin as well as liquid phase solvent-free polymerization, gas phase polymerization or melt polymerization substantially free from solvent. The polymerization may be effected continuously or batchwise. Preferred among these polymerization processes is solvent polymerization. or liquid phase solvent-free polymerization.

As the solvent to be used in solvent polymerization there may be used an inert saturated aliphatic or aromatic hydrocarbon such as pentane, cyclohexane and benzene, singly or in admixture. The polymerization temperature is normally from −78° C. to 250° C., preferably from −20° C. to 100° C., particularly from 0° C. to 100° C. The monomer partial pressure in the reaction system is not specifically limited but is preferably from atmospheric pressure to 200 MPa, more preferably from atmospheric pressure to 5 MPa. Further, the molecular weight of the resulting polymer can be properly adjusted by any known method such as predetermination of temperature or pressure and introduction of hydrogen.

The preparation of the propylene block copolymer of the present invention is normally carried out by two or more stages. On the other hand, the preparation of PP resin and EPR can be normally carried out by one or more stages. The polymerization reaction may be effected in the form of solvent polymerization using an inert hydrocarbon such as propane, butane, hexane, heptane and toluene or solvent such as liquefied α-olefin as well as liquid phase solvent-free polymerization, gas phase polymerization or melt polymerization substantially free from solvent. The polymerization may be effected continuously or batchwise. Preferred among these polymerization processes is solvent polymerization or liquid phase solvent-free polymerization.

As the solvent to be used in solvent polymerization there may be used an inert saturated aliphatic or aromatic hydrocarbon such as pentane, cyclohexane and benzene, singly or in admixture. The polymerization temperature is normally from −78° C. to 250° C., preferably from −20° C. to 100° C., particularly from 0° C. to 100° C. The monomer partial pressure in the reaction system is not specifically limited but is preferably from atmospheric pressure to 200 MPa, more preferably from atmospheric pressure to 5 MPa. Further, the molecular weight of the resulting polymer can be properly adjusted by any known method such as predetermination of temperature or pressure and introduction of hydrogen.

For the preparation of the block copolymer of the present invention, the polymer block obtained by the polymerization of propylene (PP block) as one of the blocks constituting the block copolymer is normally prepared by the first stage polymerization during the preparation of the block copolymer. Similarly, PP resin in the resin composition is prepared by the same process as the first stage polymerization during the preparation of the block copolymer.

For the preparation of PP moiety (general term for PP block and PP resin), a propylene may be used singly as a monomer. Further, the propylene may be copolymerized with a $C_{2-20}$, preferably $C_{2-10}$ α-olefin other than propylene in an amount of not more than 10 mol-%. Specific examples of the α-olefin employable herein include ethylene, propylene, 1-butene, 4-methyl-1-pentene, 1-hexene, 1-octene, 1-decene, 1-dodecene, 1-tetradecene, 1-hexadecene, 1-octadecene, and 1-eicosene.

In the case of block copolymer, the polymerization temperature and polymerization time are normally predetermined such that the amount of the polymer obtained at the first stage is from 50 to 95% by weight based on the total produced amount of polymers.

For the preparation of the ethylene-propylene copolymer as EPR block at the second stage, a propylene and an ethylene are copolymerized in the presence of the polymer produced at the first stage. The polymerization ratio (molar ratio) of propylene to ethylene is predetermined such that the propylene content in the copolymer thus produced is from 20 mol-% to 80 mol-% as previously mentioned. In general, the polymerization temperature and polymerization time are predetermined such that the amount of the polymer obtained at the second stage is from 5 to 50% by weight based on the total produced amount of polymers. The polymerization temperature is normally from 0° C. to 100° C., preferably from 20° C. to 90° C. As a molecular weight adjustor for the ethylene-propylene copolymer there is preferably used hydrogen.

The first stage and second stage polymerization processes may be followed by a third stage or subsequent polymerization such as copolymerization of a propylene with other α-olefins, homopolymerization of ethylene and copolymerization of ethylene with other α-olefins.

The term "block copolymer" as used herein is meant to indicate not only an ideal compound, i.e., compound comprising a block produced at the first stage polymerization (PP block) and a block produced at the second stage polymerization (EPR block) present on one molecular chain but also a physical mixture of polymers produced at various steps according to conventional processes and various forms of polymers intermediate between the mixture and the foregoing ideal block copolymer.

On the other hand, referring to the mixing proportion of PP resin and EPR in the resin composition of the present invention, the proportion of EPR is from 5 to 100 parts by weight, preferably from 10 to 50 parts by weight, more preferably from 10 to 30 parts by weight based on 100 parts by weight of PP resin.

If the blending proportion of EPR exceeds 100 parts by weight, the improvement in impact resistance corresponding to the rise in the amount of EPR cannot be provided and the rigidity of the resin composition is drastically deteriorated. On the contrary, if the blending proportion of EPR falls below 5 parts by weight, a sufficient effect of improving the low temperature impact resistance cannot be exerted.

The ethylene-propylene copolymer rubber to be used herein is not limited to a substance having a so-called rubber elasticity ("Kagaku Jiten (Dictionary of Chemistry)", Tokyo Kagaku Dojin, 1994). A copolymer having a low crystallinity and a low elasticity as compared with polyolefin resins may be used. The crystallinity of EPR to be used is preferably not more than 15%, more preferably not more than 10%. The 20° C. dynamic elastic modulus of EPR to be used is preferably not more than 10 MPa, more preferably not more than 5 MPa. If the dynamic properties of the ethylene-propylene copolymer is close to that of polypropylene resins, no effect of improving the impact resistance can be exerted.

If necessary, the block copolymer or resin composition of the present invention may comprise a reinforcing material such as talc, calcium carbonate, titanium oxide, carbon black, mica, glass fiber, carbon fiber, fiber of metal (e.g., stainless steel) and metal whisker incorporated therein in an amount of from 10 to 60 parts by weight based on 100 parts by weight of the block copolymer. The block copolymer or resin composition of the present invention may comprise additives such as oxidation inhibitor, photo-deterioration inhibitor, antistat and nucleating agent incorporated therein.

EXAMPLES

The present invention will be further described in the following examples, but the present invention should not be construed as being limited thereto.

(I) Method for the Measurement of Properties

The method for the preparation of the specimen to be measured will be described in Examples 1 and 5.

Molecular Weight

For the measurement of average molecular weight (weight-average molecular weight Mw and number-average molecular weight Mn), GPC (gel permeation chromatography; apparatus: Type GPC150C, produced by Waters Inc.) was used. The average molecular weight was then calculated from the correction curve of molecular weight given by standard polystyrene with orthodichlorobenzene as an eluent at a temperature of 140° C. by the polypropylene viscosity equation:

$$\eta = 3.91 \times 10^{-4} \cdot M^{-0.7}$$

For ethylene-propylene copolymer, similar calculation was used.

The molecular weight distribution (Q value) was calculated from the ratio of Mw to Mn thus obtained (Q=Mw/Mn).

Proportion of Mesopentad Chain

For the measurement of the content of mesopentad chain [mmmm] and 1,3-addition bond in the polypropylene, a Type JMN GSX270 nuclear magnetic resonance spectroscopy (produced by JEOL Ltd.) was used. In some detail, the polymer was dissolved in 2 ml of orthodichlorobenzene. To the solution was then added 0.5 ml of deuterated benzene as a locking solvent. The specimen thus obtained was then measured for nuclear magnetic resonance spectrum at a temperature of 130° C. In order to enhance S/N ratio, integral measurement was effected 10,000 times. For the analysis of measurements, a method proposed by J. C. Randall was used ("Journal of Polymer Science", 12, 703, 1974) to estimate mesopentad chain [mmmm].

For the determination of 1,3-addition bond, peak was assigned according to the method described in A. Zambelli, "Macromolecules", 21 (3), 617 (1988). The molar percent of 1,3-addition bond was then calculated from the total amount of carbon atoms in —CH$_2$— and —CH—.

Melting Point

For the measurement of melting point, a Type DSC7 differential scanning calorimeter (produced by Perkin Elmer Inc.) was used. The specimen was once heated and cooled at a rate of 10° C./min. between 20° C. and 200° C. The measurement of melting peak temperature was effected during the second temperature rise.

Long Period L of Crystal Structure

For the measurement of long period L of crystal structure, the method described herein was used.

Melt Flow Rate (MFR)

The measurement of MFR was effected according to ASTM-D-1238. MFR was represented by extrusion of polymer per 10 minutes (g/10 min).

Flexural Modulus (FM)

A specimen prepared by injection molding was subjected to measurement according to ASTM-D-790 at 23° C.

Mechanical Loss Tangent Angle (tan δ)

For the measurement of temperature dispersion of mechanical loss tangent angle (tan δ), a mechanical spectrometer produced by Rheometrix Inc. was used. The measurement was effected at a rate of 2° C./min, a strain of 1 radian and a frequency of 1 Hz.

Izod Impact Strength

A notched injection-molded specimen was measured for Izod impact strength at 23° C. and −30° C. according to ASTM-D-256.

Composition of Ethylene Propylene Rubber (EPR)

The propylene content in the ethylene-propylene copolymer was measured by nuclear magnetic resonance spectroscopy (JNM GSX270, produced by JEOL Ltd.; o-dichlorobenzene/benzene-d$_6$) as in the measurement of mesopentad chain. For the analysis of measurements, a method proposed by H. N. Cheng, "Macromolecules", vol. 17, page 1,950, 1984 was used.

For the measurement of fluctuation of composition in the molecular weight of the ethylene propylene copolymer, GPC produced by Waters Inc. was used. As a column there was used 806MS produced by Showdex Inc. As a flow cell there was used Zero-Dead, vol. cl produced by BARNES Inc. As a detector there was used IR produced by Nikolet Co., Ltd. In some detail, 200 ml of a 4 mg/ml solution of EPR in chloroform as a solvent was allowed to flow at a rate of 1 ml/min at normal temperature during measurement. The resolution was 4 cm$^{-1}$. For the analysis of measurements, an analysis software developed by Omrock Inc. was used. The intensity at 2,950 cm$^{-1}$ and 2,180 cm$^{-1}$ were then measured. Using the fact that the ratio of intensity at the various eluting times ($I_{2950}/I_{2180}$) is proportional to ethylene fraction, the relationship between molecular weight and copolymer composition was evaluated. If the intensity ratio at the various molecular weights is within ±5% from the average intensity ratio, it was determined that the fluctuation of composition in molecular weight is within ±5% from the average composition.

(II) Example/Comparative Example

Example 1

(1) Preparation of Catalyst Component

<Synthesis of Component (A): Dimethylsilylenebis{1,1'-(2-methyl-4-phenyl-4-hydroazulenyl)}hafnium Dichloride>

All the following reactions were effected in an atmosphere of inert gas. As the reaction solvent there was used a solvent which had been previously dried.

(a) Synthesis of Racemic-meso Mixture 3.22 g of 2-methylazulene synthesized according to a method described in JP-A-62-207232 (The term "JP-A" as used herein means an "unexamined published Japanese patent application") was dissolved in 30 ml of hexane. To the solution was then added gradually 21 ml (1.0 equivalent) of a cyclohexane-diethylether solution of phenyl lithium at a temperature of 0° C. The solution was stirred at room temperature for 1.5 hours, and then cooled to a temperature of −78° C. To the solution was then added 30 ml of tetrahydrofuran. To the solution were then added 45 μmol of 1-methylimidazole and 1.37 ml of dimethyldichlorosilane. The temperature of the solution was returned to room temperature where the solution was then stirred for 1 hour. Thereafter, to the solution was added an aqueous solution of ammonium chloride to make a dispersion. The resulting organic phase was dried over magnesium sulfate, and then freed of solvent by distillation under reduced pressure to obtain 5.84 g of bis{1,1'-(2-methyl-4-phenyl-1,4-dihydroazulenyl)}dimethylsilane in the form of crude product.

The crude product of bis{1,1'-(2-methyl-4-phenyl-1,4-dihydroazulenyl)}dimethylsilane thus obtained was then dissolved in 30 ml of diethyl ether. To the solution was then added dropwise 14.2 ml (1.6 mol/l) of a hexane solution of n-butyl lithium at a temperature of −78° C. The temperature of the solution was then gradually returned to room temperature where the solution was then stirred for 12 hours. The solvent was then distilled off under reduced pressure. To the residue was then added 80 ml of a 40:1 mixture of toluene and diethyl ether. To the mixture was then added 3.3 g of hafnium tetrachloride at a temperature of −60° C. The temperature of the solution was then gradually returned to room temperature where the solution was then stirred for 4 hours. The resulting solution was then concentrated under reduced pressure. The resulting solid was washed with toluene, and then extracted with dichloromethane to obtain 1.74 g of a racemic-meso mixture of dimethylsilylenebis{1,1'-(2-methyl-4-phenyl-4-hydroazulenyl)}hafnium dichloride.

(b) Purification of Racemate 1.74 g of the racemic-meso mixture thus obtained was dissolved in 30 ml of dichloromethane, and then introduced into a pyrex vessel equipped with a 100 W high pressure mercury vapor lamp. The solution was then irradiated with light with stirring at atmospheric pressure for 40 minutes so that the proportion of racemate was enhanced. Dichloromethane was then distilled off under reduced pressure. To the resulting yellow solid was then added 10 ml of toluene. The mixture was stirred, and then filtered. The resulting solid was then washed with 8 ml of toluene and with 4 ml of hexane to obtain 917 mg of a racemate of dimethylsilylenebis{1,1'-(2-methyl-4-phenyl-4-hydroazulenyl)}hafnium dichloride.

<Preparation of Component (C)>

135 ml of desalted water and 16 g of magnesium sulfate were measured out in a 500 ml round flask. The mixture was then stirred to make a solution. To the solution thus obtained was then added 22.2 g of montmorillonite ("Kunipia F", produced by Kunimine Industry Corp.). The mixture was heated to a temperature of 80° C. for 1 hour. Subsequently, to the solution was added 300 ml of desalted water. The solution was then stirred to recover a solid content.

To the solid content were then added 46 ml of desalted water, 23.4 g of sulfuric acid and 29.2 g of magnesium sulfate. The mixture was then heated under reflux for 2 hours. To the mixture thus treated was then added 200 ml of desalted water. The mixture was then filtered. To the residue was then added 400 ml of desalted water. The mixture was then filtered. This procedure was then repeated twice. The material was then dried at a temperature of 100° C. to obtain chemically treated montmorillonite.

1.05 g of the foregoing chemically treated montmorillonite was then measured in a 100 ml flask. The chemically treated montmorillonite was then dried at a temperature of 200° C. under reduced pressure for 2 hours. In an atmosphere of purified nitrogen, to the material thus dried was then added 3.5 ml of a 0.5 mmol/l toluene solution of triethyl aluminum. The mixture was then allowed to undergo reaction at room temperature for 1 hour. The reaction product was then washed with 30 ml of toluene twice to obtain Component (C) in the form of toluene slurry.

(2) Prepolymerization of Propylene

To the total amount of the foregoing slurry were then added 0.6 ml of a 0.5 mmol/ml toluene solution of triisobutyl aluminum and 19.1 ml of a 1.5 μmol/ml toluene solution of a racemate of dimethylsilylenebis{1,1'-(2-methyl-4-phenyl-4-hydroazulenyl)}hafnium dichloride synthesized in the foregoing process (1). These components were then allowed to come in contact with each other at room temperature for 10 minutes.

Into a 2 l induction-agitated autoclave were then introduced 40 ml of toluene and the total amount of the foregoing catalytic reaction product in an atmosphere of purified nitrogen. Propylene was then introduced into the reaction mixture with stirring. The reaction mixture was then allowed to undergo prepolymerization at room temperature and a total polymerization pressure of 0.6 MPa for 3 minutes. Subsequently, unreacted propylene was purged. The air in the autoclave was then replaced by purified nitrogen under pressure. The resulting prepolymerization catalyst was then withdrawn. The prepolymerization catalyst contained a polymer in an amount of 2.98 g per g of Component (C).

(3) Block Copolymerization

Into a 2 l induction-agitated autoclave equipped with an anchor-like agitating blade in which the air within had been replaced by purified nitrogen was charged 0.6 ml of a 0.5 mmol/ml toluene solution of triisobutyl aluminum. Hydrogen gas was then pressed into the autoclave at 12.9 KPa. Liquefied propylene was then pressed into the autoclave in an amount of 700 g. Thereafter, the prepolymerization catalyst obtained in the foregoing process (2) was pressed into the autoclave as a solid catalyst component in an amount of 37.5 mg. The reaction mixture was heated to a temperature of 75° C. where it was then allowed to undergo polymerization for 30 minutes. Subsequently, excess propylene and hydrogen were discharged out of the reaction system to terminate the first stage polymerization reaction.

The polymer obtained at the first stage (PP block) was then measured for weight. The results were 340 g. The polypropylene thus obtained was withdrawn in an amount of 90 g in a flow of purified nitrogen. The polypropylene was then heated to a temperature of 60° C. with stirring. Thereafter, propylene gas and ethylene gas (molar ratio: 1:1) were pressed into the reaction system to an extent such that the total polymerization pressure reached 1.96 MPa to initiate the second stage polymerization. The second stage reaction was effected at a temperature of 60° C. for 100 minutes while a mixture of propylene and ethylene having the same composition as the charged gas was being supplied in such a manner that the total polymerization pressure reached 1.96 MPa. Thereafter, propylene and ethylene were discharged out of the reaction system to obtain 316 g of a propylene block copolymer in the form of white powder.

The content of the polymer (EPR block) produced at the second stage in the block copolymer thus obtained was 21% by weight. The content of ethylene in EPR block was 40 mol-%. MFR of EPR block copolymer was 10. The polypropylene obtained at the first stage exhibited MFR of 36, a weight-average molecular weight of $21 \times 10^4$, a melting point of 153° C., a mesopentad chain [mmmm] proportion of 99.5% and a 1,3-addition bond content of 0.5 mol-%.

To 100 parts by weight of the polymer powder thus obtained were then added 0.05 parts by weight of Irugafos 168 (produced by Ciba Geigy Inc.), 0.05 parts by weight of Iruganox 1010 (produced by Ciba Geigy Inc.) and 0.05 parts by weight of calcium stearate. The mixture was then kneaded at a temperature of 210° C. by means of a single-axis extruder having an inner diameter of 30 mm. Subsequently, an injection-molded specimen was prepared from the mixture thus kneaded. The injection-molded specimen thus prepared was then measured for various physical properties. As a result, the flexural modulus FM was 931 MPa. Referring to Izod impact strength, the specimen was not destroyed at a temperature of 23° C. The specimen exhibited an Izod impact strength of 0.72 $J/cm^2$ at a temperature of −30° C.

Example 2

(1) Preparation of Catalyst Component

<Synthesis of Component (A): Dimethylsilylenebis[1,1'-{2-methyl-4-phenyl-4-hydroazulenyl}]zirconium Dichloride>

All the following reactions were effected in an atmosphere of inert gas. As the reaction solvent there was used a solvent which had been previously dried.

(a) Synthesis of Racemic-meso Mixture 5.84 g of bis{1,1'-(2-methyl-4-phenyl-1,4-dihydroazulenyl)}dimethylsilane in the form of crude product was prepared in the same manner as in the prestage in Paragraph (1) (a) of Example 1.

The crude product of bis{1,1'-(2-methyl-4-phenyl-1,4-dihydroazulenyl)}dimethylsilane thus obtained was then dissolved in 30 ml of diethyl ether. To the solution was then added dropwise 14.2 ml (1.6 mol/l) of a hexane solution of n-butyl lithium at a temperature of −78° C. The temperature of the solution was then gradually returned to room temperature where the solution was then stirred for 12 hours. The solvent was then distilled off under reduced pressure. To the residue was then added 80 ml of a 40:1 mixture of toluene and diethyl ether. To the mixture was then added 2.4 g of zirconium tetrachloride at a temperature of −60° C. The temperature of the solution was then gradually returned to room temperature where the solution was then stirred for 4 hours. The resulting solution was then concentrated under reduced pressure. The resulting solid was washed with toluene, and then extracted with dichloromethane to obtain 1.25 g of a racemic-meso mixture of dimethylsilylene bis{1,1'-(2-methyl-4-phenyl-4-hydroazulenyl)}zirconium dichloride.

(b) Purification of Racemate 1.25 g of the racemic-meso mixture thus obtained was dissolved in 30 ml of dichloromethane, and then introduced into a pyrex vessel equipped with a 100 W high pressure mercury vapor lamp. The solution was then irradiated with light with stirring at atmospheric pressure for 40 minutes so that the proportion of racemate was enhanced. Dichloromethane was then distilled off under reduced pressure. To the resulting yellow solid was then added 10 ml of toluene. The mixture was stirred, and then filtered. The resulting solid was then washed with 8 ml of toluene and with 4 ml of hexane to obtain 830 mg of a racemate of dimethyl silylenebis{1,1'-(2-methyl-4-phenyl-4-hydroazulenyl)}zirconium dichloride.

<Preparation of Component (C)>
The procedure of Example 1 was followed.
(2) Prepolymerization of Propylene A prepolymerization catalyst was prepared in the same manner as in Example 1 except that the racemate of dimethylsilylenebis{1,1'-(2-methyl-4-phenyl-4-hydroazulenyl)}zirconium dichloride was used instead of the racemate of dimethylsilylenebis[1,1'-(2-methyl-4-phenyl-4-hydroazulenyl)]hafnium dichloride. The prepolymerization catalyst thus obtained contained a polymer in an amount of 3.50 g per g of Component (C).

(3) Block Copolymerization

The first stage polymerization was effected in the same manner as in Paragraph (3) of Example 1 except that the charged amount of hydrogen during the first stage polymerization was 5 KPa.

The polymer obtained at the first stage (PP block) was then measured for weight. The results were 320 g. The polypropylene thus obtained was withdrawn in an amount of 60 g in a flow of purified nitrogen. The polypropylene was then heated to a temperature of 60° C. with stirring. Thereafter, propylene gas and ethylene gas (molar ratio: 1:1) were pressed into the reaction system to an extent such that the total polymerization pressure reached 1.96 MPa to initiate the second stage polymerization. The polymerization reaction was effected at a temperature of 60° C. for 50 minutes while a mixture of propylene and ethylene having the same composition as the charged gas was being supplied in such a manner that the total polymerization pressure reached 1.96 MPa. Thereafter, propylene and ethylene were discharged out of the reaction system to obtain 310 g of a propylene block copolymer in the form of white powder. The content of the polymer (EPR block) produced at the second stage in the block copolymer thus obtained was 16% by weight. The content of ethylene in EPR block was 40 mol-%. MFR of EPR block copolymer was 15. The polypropylene obtained at the first stage exhibited MFR of 38, a weight-average molecular weight of $18\times10^4$, a melting point of 149° C., a mesopentad chain [mmmm] proportion of 99.3% and a 1,3-addition bond content of 0.3 mol-%.

The block copolymer thus obtained was evaluated in the same manner as in Example 1. The results are set forth in the table below.

Comparative Example 1

A commercially available block copolymer (BC03G, produced by Nihon Polychem Co., Ltd.) was molded and evaluated in the same manner as in Example 1. The xylene-insoluble fraction of the block copolymer was evaluated as PP block. The xylene-soluble fraction of the block copolymer was evaluated as EPR block.

The results of evaluation are set forth in the table below.

(3) Evaluation of Results

The block copolymer of the present invention set forth in Example 1 exhibits a drastically improved low temperature impact strength while the various blocks show a molecular weight, composition and composition ratio similar to that of Comparative Example 1.

These block copolymers exhibit a flexural modulus on the same level. It can be seen that the block copolymer of the present invention has PP block with a low melting point and thus exhibits a good moldability.

TABLE 1

|  |  | Example 1 | Example 2 | Comparative Example 1 |
|---|---|---|---|---|
| PP block | Weight-average molecular weight ($M_{w.PP}$) ($10^4$) | 21 | 18 | 29 |
|  | Number-average molecular weight ($10^4$) | 3.8 | 5.5 | 3.4 |
|  | (mmmm) (%) | 99.5 | 99.3 | 99 |
|  | 1,3-Addition bond (mol - %) | 0.5 | 0.3 | <0.03 |
|  | Melting point Tm (° C.) | 153 | 149 | 163 |
|  | Long period L (nm) | 13.8 | 14.3 | 16.6 |
| EPR block | Weight-average molecular weight ($M_{w.R}$) ($10^4$) | 64 | 44 | 40 |
|  | Number-average molecular weight ($10^4$) | 20 | 20 | 5.3 |
|  | Propylene content (mol - %) | 60 | 60 | 60 |
|  | Composition fluctuation[*1] (%) | 2.5 | 1.5 | 15.5 |
|  | Maxima of mechanical loss tangent angle (tan δ) (° C.) | −41 | −42 | −38 |
|  | Half-width of absorption curve (°) | 15 | 17 | 32 |
| Block copolymer |  |  |  |  |
| Physical properties | Composition ratio PP/EPR | 79/21 | 84/16 | 80/20 |
|  | Disperse particle diameter[*2] (μm) | 1.5 | 2.0 | 3.0 |
|  | Interface thickness (nm) | 70 | 50 | <5 |
| Mechanical properties | Izod impact strength (23° C.) (J/cm²) | Not fractured | 0.99 | 1.2 |
|  | Izod impact strength (−30° C.) (J/cm²) | 0.72 | 0.48 | 0.49 |
|  | Flexural modulus (MPa) | 930 | 890 | 800 |

[*1]Composition fluctuation = Fluctuation of composition in molecular weight (deviation from average)
[*2]Disperse particle diameter = Particle diameter as calculated in terms of circle corresponding to weight-average area of disperse phase Example 3

[PP Resin] (Specimen a)
(1) Preparation of Catalyst Component
<Synthesis of Component (A): dimethylsilylenebis{1,1'-(2-methyl-4-phenyl-4-hydroazulenyl)}hafnium dichloride>

The procedure of Example 1 was followed.
(2) Prepolymerization of Propylene
The procedure of Example 1 was followed.
(3) Polymerization of Propylene Into a 2 l induction-agitated autoclave equipped with an anchor-like agitating blade in which the air within had been replaced by purified nitrogen was charged 0.6 ml of a 0.5 mmol/ml toluene solution of triisobutyl aluminum. Hydrogen gas was then pressed into the autoclave at 12.9 KPa. Liquefied propylene was then pressed into the autoclave in an amount of 700 g. Thereafter, the prepolymerization catalyst obtained in Paragraph (2) of Example 1 was pressed into the autoclave as a solid catalyst component in an amount of 50.2 mg. The reaction mixture was heated to a temperature of 75° C. where it was then allowed to undergo polymerization for 40 minutes. As a result, 471 g of a polypropylene resin was obtained.

The properties of the polypropylene are set forth in Table 2.

[EPR] (Specimen X)
(4) Preparation of Catalyst Component
<Component (A)>

A racemate of dimethylsilylenebis(2-methylbenzo indenyl)zirconium dichloride was synthesized as Component (A) according to a method described in "Organometallics", 1994, 13, 964.

(5) Prepolymerization of Propylene

Into an agitated glass reaction vessel having an inner volume of 0.5 l was charged 2.4 g (20.7 mmol-Al) of MAO (methyl aluminoxane) on $SiO_2$ (produced by WITCO Inc.). Into the reaction vessel was then introduced 50 ml of n-heptane. To the mixture was then added 20.0 ml (0.637 mmol) of a toluene solution of a racemate of dimethylsilylenebis(2-methylbenzoindenyl)zirconium dichloride. Subsequently, to the mixture was added 4.14 ml (3.03 mmol) of a n-heptane solution of triisobutyl aluminum (TIBA).

Thereafter, the reaction mixture was then allowed to undergo reaction at room temperature for 2 hours. Propylene was then allowed to flow through the reaction system to cause prepolymerization. As a result, a solid catalyst component was obtained.

(6) Preparation of Ethylene-propylene Copolymer

Into a 3 l agitated autoclave in which the air within had been replaced by purified nitrogen was introduced 1.5 l of dehydrated and deoxidized n-heptane. To n-heptane was then added 100 mg of triethyl aluminum. The temperature of the mixture was then raised to 65° C. The prepolymerization catalyst obtained above was then pressed into the autoclave in an amount of 150 mg. Into the autoclave was then introduced a mixture of propylene and ethylene (ethylene concentration in the mixture: 30% by weight) prepared in a separate gas adjusting tank in such an amount that a pressure of 5 kg/cm²·G was reached. The reaction mixture was then allowed to undergo polymerization with the temperature and pressure being maintained for 3 hours. As a result, 163 g of the ethylene-propylene copolymer set forth in Table 1 was obtained.

[Resin Composition]

PP resin and EPR thus obtained were measured out in an amount such that a predetermined composition was obtained (80/20 in the present example). A resin composition was then prepared from this composition according to the following process for the preparation of specimen to be measured, and then evaluated. In some detail, PP resin and EPR were measured out at a predetermined weight ratio. To these components was then added a heat stabilizer. Using a laboratory plastomill (produced by Toyo Seiki Seisakusho, Ltd.), the mixture was melt-kneaded at a temperature of 240° C. for 5 minutes to prepare a resin composition specimen.

Using a hot press molding machine (produced by Toyo Seiki Seisakusho, Ltd.), the specimen thus obtained was melted at a temperature of 260° C. for 10 minutes, compression-molded, and then rapidly water-cooled to prepare a specimen to be measured.

The results are set forth in Table 2.

The resin compositions according to the following examples and comparative examples were similarly prepared and evaluated. (The results of evaluation of the comparative examples are set forth in Table 3.)

Example 4
[PP Resin] (Specimen b)

Into a 2 l induction-agitated autoclave equipped with an anchor-like agitating blade in which the air within had been replaced by purified nitrogen was charged 1.5 ml of a 0.2 mmol/ml toluene solution of triisobutyl aluminum. Hydrogen gas was then pressed into the autoclave at 13.2 KPa. Liquefied propylene was then pressed into the autoclave in an amount of 700 g. Thereafter, the prepolymerization catalyst obtained in Paragraph (2) of Example 1 was pressed into the autoclave as a solid catalyst component in an amount of 38.8 mg. The reaction mixture was heated to a temperature of 75° C. where it was then allowed to undergo polymerization for 40 minutes. As a result, 214 g of a polypropylene resin was obtained.

[EPR] (Specimen Y)

The copolymerization of ethylene and propylene was effected in the same manner as described in Paragraphs (4) to (6) of Example 3 except that the ethylene concentration in the mixed gas was 60% by weight. As a result, the ethylene-propylene copolymer set forth in Table 2 was obtained.

Example 5
[PP Resin] (Specimen c)
(1) Preparation of Catalyst Component

A solid catalyst component was obtained according to the method described in JP-A-3-234707 (Component (A) of Example 1)

(2) Polymerization of Propylene

Into a 100 l agitated autoclave in which the air within had been thoroughly replaced by propylene was introduced 25 l of purified n-heptane. Into the autoclave were then introduced 0.5 l of a 0.1 mol/l n-heptane solution of triethyl aluminum and 3.2 g of the solid catalyst component synthesized in Paragraph (1) at a temperature of 65° C. Propylene was then fed to the autoclave at a rate of 4.5 kg/hr at a temperature of 75° C. for 213 minutes while the hydrogen concentration in the gas phase was being kept at 2.2 vol-%. The polymerization further proceeded for 40 minutes.

Thereafter, butanol was used to decompose the catalyst. The reaction product was filtered, and then dried to obtain 12.1 kg of the polypropylene resin set forth in Table 2.
[EPR] (Specimen X)

As EPR component there was used EPR (Specimen X) prepared in Example 3.

The results of evaluation of EPR are set forth in Table 2.

Comparative Example 2
[PP Resin] (Specimen c)

As PP resin there was used the polypropylene (Specimen c) obtained in Example 5.

[EPR] (Specimen Z)

Into a 3 l agitated autoclave in which the air within had been replaced by purified nitrogen was introduced 1.5 l of dehydrated and deoxidized n-heptane. To n-heptane was then added 160 mg of diethyl aluminum chloride. The temperature of the mixture was then raised to 65° C. Subsequently, a titanium trichloride catalyst (01 catalyst) produced by M & S Catalyst Co., Ltd. was then pressed into the autoclave in an amount of 40 mg. Into the autoclave was then introduced a mixture of propylene and ethylene (ethylene concentration in the mixture: 25% by weight) prepared in a separate gas adjusting tank in such an amount that a pressure of 5 kg/cm$^2$·G was reached. The reaction mixture was then allowed to undergo polymerization with the temperature and pressure being maintained for 3 hours. As a result, 181 g of the ethylene-propylene copolymer (EPR) set forth in Table 3 was obtained.

Comparative Example 3

[PP Resin]

As a polypropylene resin there was used the polypropylene (Specimen a) described in Example 3.

[EPR]

As an ethylene-propylene copolymer there was used EPR (Specimen Z) obtained in Comparative Example 2.

(III) Evaluation of Results

PP resins and EPR compositions having predetermined properties of the present invention according to Examples 3 and 4 exhibit good impact resistance and rigidity as compared with the comparative examples.

TABLE 2

|  |  | Example 3 | Example 4 | Example 5 |
|---|---|---|---|---|
| PP resin | Specimen | a | b | c |
|  | Weight-average molecular weight ($M_{w,PP}$) ($10^4$) | 23 | 11.5 | 33 |
|  | Number-average molecular weight ($10^4$) | 9.0 | 4.5 | 6.5 |
|  | Mesopentad chain (mmmm) (%) | 99.4 | 99.5 | 98.7 |
|  | 1,3-Addition bond (mol - %) | 0.5 | 0.3 | <0.03 |
|  | Melting point Tm (° C.) | 153 | 154 | 165 |
|  | Long period L (nm) | 13.2 | 13.0 | 15.7 |
| EPR | Specimen | X | Y | X |
|  | Weight-average molecular weight ($M_{w,R}$) ($10^4$) | 8.4 | 10.9 | 8.4 |
|  | Number-average molecular weight ($10^4$) | 1.9 | 2.4 | 1.9 |
|  | Propylene content (mol - %) | 60 | 30 | 60 |
|  | Composition fluctuation[*1] (%) | 2.5 | 5 | 2.5 |
|  | Maxima of mechanical loss tangent angle (tan δ) (° C.) | −46 | −50 | −46 |
|  | Half-width of absorption curve (°) | 15 | 17 | 15 |
| Composition |  |  |  |  |
| Properties | Composition ratio PP/EPR | 80/20 | 84/16 | 80/20 |
|  | Disperse particle diameter[*2] (μm) | 1.5 | 2.0 | 2.2 |
|  | Interface thickness (nm) | 60 | 50 | 25 |
| Performance | Low temperature impact strength (−30° C.) (KJ/m$^2$) | 4.4 | 5.4 | 4.0 |
|  | Olsen flexural rigidity (MPa) | 720 | 700 | 850 |

[*1]Composition fluctuation = Fluctuation of composition in molecular weight (deviation from average)
[*2]Disperse particle diameter = Particle diameter as calculated in terms of circle corresponding to weight-average area of disperse phase

TABLE 3

|  |  | Comparative Example 2 | Comparative Example 3 |
|---|---|---|---|
| PP resin | Specimen | c | a |
|  | Weight-average molecular weight ($M_{w,PP}$) ($10^4$) | 33 | 23 |
|  | Number-average molecular weight ($10^4$) | 6.5 | 9.0 |
|  | Mesopentad chain (mmmm) (%) | 98.7 | 99.4 |
|  | 1,3-Addition bond (mol - %) | <0.03 | 0.5 |
|  | Melting point Tm (° C.) | 165 | 153 |
|  | Long period L (nm) | 16.7 | 13.2 |
| EPR | Specimen | Z | Z |
|  | Weight-average molecular weight ($M_{w,R}$) ($10^4$) | 15 | 15 |
|  | Number-average molecular weight ($10^4$) | 2.8 | 2.8 |
|  | Propylene content (mol - %) | 30 | 30 |
|  | Composition fluctuation[*1] (%) | >50 | >50 |
|  | Maxima of mechanical loss tangent angle (tan δ) (° C.) | −41 | −41 |
|  | Half-width of absorption curve (°) | 32 | 32 |
| Composition |  |  |  |
| Properties | Composition ratio PP/EPR | 80/20 | 80/20 |
|  | Disperse particle diameter[*2] (μm) | 3.0 | 2.1 |
|  | Interface thickness (nm) | <5 | 9 |
| Performance | Low temperature impact strength (−30° C.) (KJ/m$^2$) | 3.2 | 4.0 |
|  | Olsen flexural rigidity (MPa) | 900 | 750 |

[*1]Composition fluctuation = Fluctuation of composition in molecular weight (deviation from average)
[*2]Disperse particle diameter = Particle diameter as calculated in terms of circle corresponding to weight-average area of disperse phase While the invention has been described in detail and with reference to specific embodiments thereof, it will be apparent to one skilled in the art that various changes and modifications can be made therein without departing from the spirit and scope thereof.

What is claimed is:

1. A block copolymer comprising one or more blocks of a polymer made of a polypropylene (hereinafter referred to as "PP block") and one or more blocks of a polymer made of an ethylene-propylene copolymer (hereinafter referred to as "EPR block") connected to each other, wherein the block copolymer and each of said blocks have the following properties (1) to (7):

(1) the thickness of the interface of PP block with EPR block in the dispersion structure of the block copolymer is from 20 nm to 1,000 nm;

(2) the weight-average molecular weight of the polypropylene in PP block (hereinafter referred to as "$M_{W.PP}$") is from 10,000 to 1,000,000;

(3) the proportion of mesopentad chain in the polypropylene in PP block is not less than 95%;

(4) the particle diameter of the disperse phase of the ethylene-propylene copolymer in EPR block is from not less than 0.2 μm to not more than 3 μm as calculated in terms of weight-average area;

(5) the weight-average molecular weight of the ethylene-propylene copolymer in EPR block (hereinafter referred to as "$M_{W.R}$") is from 50,000 to 1,000,000;

(6) the propylene content in the ethylene-propylene copolymer with EPR block is from 20 mol-% to 80 mol-%; and (7) the composition fluctuation in molecular weight of the ethylene-propylene copolymer in EPR block is within ±5% from the average composition.

2. The block copolymer according to claim 1, wherein PP block has the following properties (8) to (12):

(8) the weight-average molecular weight ("$M_{W.PP}$") is from 50,000 to 800,000;

(9) the ratio of weight-average molecular weight to number-average molecular weight is not more than 6;

(10) the proportion of mesopentad chain is not less than 97%;

(11) the proportion of 1,3-addition bond is from 0.05 mol-% to 3 mol-%; and

(12) the melting point (hereinafter referred to as "$T_{m.PP}$") is from 140° C. to 170° C.

3. The block copolymer according to claim 1 obtained by the polymerization of propylene monomers in the presence of a catalyst comprising the following components (A) and (B): component (A): a crosslinked metallocene-based transition metal compound represented by the following general formula (1):

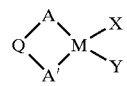

(1)

wherein A and A' may be the same or different and each represent a conjugated 5-membered ring ligand; Q represents a bonding group which crosslinks the two conjugated 5-membered ring ligands represented by A and A' at arbitrary position; M represents a metal atom selected from the group consisting of elements belonging to the groups 4 to 6 in the periodic table; and X and Y each represent the same or different atom or group selected from the group consisting of hydrogen atom, halogen atom, hydrocarbon group, alkoxy group, amino group, phosphor-containing hydrocarbon group and silicon-containing hydrocarbon group; and component (B): at least one compound selected from the group consisting of:

(a) an aluminumoxy compound;

(b) a Lewis acid; and (c) an ionic compound capable of reacting with Component (A) to convert Component (A) to cation.

4. The block copolymer according to claim 1 obtained by the polymerization of propylene monomers in the presence of a catalyst comprising the following components (A) and (C): component (A): a transition metal compound represented by the following general formula [1]:

[1]

wherein A and A' may be the same or different and each represent a conjugated 5-membered ring ligand; Q represents a bonding group which crosslinks the two conjugated 5-membered ring ligands represented by A and A' at arbitrary position; M represents a metal atom selected from the group consisting of elements belonging to the groups 4 to 6 in the periodic table; and X and Y each represent the same or different atom or group selected from the group consisting of hydrogen atom, halogen atom, hydrocarbon group, alkoxy group, amino group, phosphor-containing hydrocarbon group and silicon-containing hydrocarbon group; and component (C): an ion-exchangeable layer compound other than silicate or inorganic silicate.

5. The block copolymer according to claim 3, wherein there is used a catalyst further comprising an organic aluminum compound as a catalyst component.

6. The block copolymer according to claim 4, wherein there is used a catalyst further comprising an organic aluminum compound as a catalyst component.

* * * * *